United States Patent
Fox et al.

(10) Patent No.: US 11,802,551 B2
(45) Date of Patent: Oct. 31, 2023

(54) DUAL-STAGE FLUIDICS SYSTEM WITH REDUCED PULSATION

(71) Applicant: Life Technologies Corporation, Carlsbad, CA (US)

(72) Inventors: Daniel N Fox, Bellvue, CO (US); Nathan M Fox, Fort Collins, CO (US)

(73) Assignee: Life Technologies Corporation, Carlsbad, CA (US)

( * ) Notice: Subject to any disclaimer, the term of this patent is extended or adjusted under 35 U.S.C. 154(b) by 191 days.

(21) Appl. No.: 17/324,309

(22) Filed: May 19, 2021

(65) Prior Publication Data

US 2021/0363979 A1  Nov. 25, 2021

Related U.S. Application Data

(60) Provisional application No. 63/185,008, filed on May 6, 2021, provisional application No. 63/026,991, filed on May 19, 2020.

(51) Int. Cl.
| | |
|---|---|
| *F04B 23/02* | (2006.01) |
| *F04B 11/00* | (2006.01) |
| *F04B 23/04* | (2006.01) |
| *F04B 43/12* | (2006.01) |
| *F04B 45/08* | (2006.01) |

(52) U.S. Cl.
CPC ............. *F04B 23/02* (2013.01); *F04B 11/00* (2013.01); *F04B 23/04* (2013.01); *F04B 43/12* (2013.01); *F04B 45/08* (2013.01); *F04B 2205/13* (2013.01)

(58) Field of Classification Search
CPC .......... F04B 23/02; F04B 23/04; F04B 43/12; F04B 45/08; F04B 2205/13
See application file for complete search history.

(56) References Cited

U.S. PATENT DOCUMENTS

| | | | | |
|---|---|---|---|---|
| 4,769,001 | A * | 9/1988 | Prince | A61M 1/3639 604/6.11 |
| 4,954,128 | A * | 9/1990 | Ford | A61M 1/308 604/6.05 |
| 6,767,188 | B2 * | 7/2004 | Vrane | G05D 16/2066 417/40 |
| 9,592,483 | B2 * | 3/2017 | Fox | B01F 33/30 |
| 10,466,155 | B2 * | 11/2019 | Ward | F04B 23/04 |
| 10,525,182 | B2 * | 1/2020 | Burbank | A61M 1/14 |
| 10,670,509 | B2 * | 6/2020 | Azuma | G05D 7/0617 |
| 2013/0333765 | A1 * | 12/2013 | Fox | G01N 15/1404 137/2 |

FOREIGN PATENT DOCUMENTS

| | | |
|---|---|---|
| WO | 2010132053 A1 | 11/2010 |
| WO | 2013192401 A1 | 12/2013 |

* cited by examiner

*Primary Examiner* — Nathan C Zollinger
(74) *Attorney, Agent, or Firm* — BakerHostetler (57) ABSTRACT

Disclosed is a dual-stage fluidics system that has reduced pulsation. This system uses inexpensive peristaltic pumps and two reservoirs that dampen pulsations in pressure. Peristaltic pumps are used as air pressure pumps and sheath fluid pumps that are placed between the two pressurized reservoirs and isolate the two reservoirs. Since the two reservoirs are maintained at a substantially even pressure, pulsations are reduced so that the peristaltic pumps essentially provide air flow and sheath fluid flow as needed.

19 Claims, 4 Drawing Sheets

DUAL-STAGE FLUIDICS SYSTEM WITH REDUCED PULSATION

CROSS REFERENCE TO RELATED APPLICATIONS

The present application claims priority to and the benefit of U.S. patent application No. 63/026,991, "Dual-Stage Fluidics System With Reduced Pulsation" (filed May 19, 2020) and U.S. patent application No. 63/185,008, "Dual-Stage Fluidics System With Reduced Pulsation" (filed May 6, 2021), the entireties of which applications are incorporated herein by reference for any and all purposes.

TECHNICAL FIELD

The present disclosure relates to the field of fluid handling systems and to the field of reduced-pulsatility fluid flow.

BACKGROUND

Various types of instrumentation, including medical research instruments, require a steady flow of fluid at a substantially constant pressure. Pumps that pump fluids typically create pulsatile flows of liquid, i.e., the pressure of the flow pulsates as a result of the pulsatile nature of the pump. Highly consistent and constant flow of fluids at a pre-determined pressure and rate has been difficult and expensive to achieve. Accordingly, there is a long-felt need in the art for systems and methods that deliver reduced-pulsatility fluid flow.

SUMMARY

In meeting the long-felt needs described above, the present disclosure provides, in one aspect, a method of generating a sheath flow for a flow cytometer, comprising: pumping sheath fluid into a first pressurized reservoir using a first peristaltic sheath fluid pump; sensing an amount of the sheath fluid in the first pressurized reservoir to create a first sheath fluid quantity signal; maintaining a predetermined amount of the sheath fluid in the first pressurized reservoir by pumping the sheath fluid into the first pressurized reservoir using the first peristaltic sheath fluid pump in response to the first sheath fluid quantity signal; pumping the sheath fluid from the first pressurized reservoir to a second pressurized reservoir using a second peristaltic sheath fluid pump; sensing an amount of the sheath fluid in the second pressurized reservoir to create a second sheath fluid quantity signal; maintaining a predetermined amount of the sheath fluid in the second pressurized reservoir by pumping the sheath fluid into the second pressurized reservoir using the second peristaltic pump in response to the second sheath fluid quantity signal; supplying air to the first pressurized reservoir using an air pump to pressurize the first pressurized reservoir; pumping air from the first pressurized reservoir to the second pressurized reservoir using a peristaltic air pump to pressurize air to a predetermined air pressure in the second reservoir; maintaining the predetermined air pressure in the second reservoir by pumping air into the second reservoir using the peristaltic air pump.

The present disclosure further provides, in one aspect, a system that generates a flow of sheath fluid for a flow cytometer, comprising: a first peristaltic sheath fluid pump that pumps the sheath fluid; a first pressurized reservoir that receives the sheath fluid from the first peristaltic pump; a first fluid sensor that senses an amount of the sheath fluid in the first pressurized reservoir and generates a first sheath fluid quantity signal that is used to control the first peristaltic sheath fluid pump to maintain a predetermined amount of sheath fluid in the first pressurized reservoir; a second peristaltic sheath fluid pump that pumps the sheath fluid; a second pressurized reservoir that receives the sheath fluid from the second peristaltic pump; a second fluid sensor that senses an amount of the sheath fluid in the second pressurized reservoir this is used to control the second peristaltic sheath fluid pump to maintain a predetermined amount of sheath fluid in the second pressurized reservoir; a peristaltic air pump that pumps air between the first pressurized reservoir and the second pressurized reservoir.

In one aspect, the present disclosure provides methods of generating a low-pulsatility fluid flow, comprising: pumping a fluid into a first pressurized reservoir using a first peristaltic fluid pump; sensing an amount of the fluid in the first pressurized reservoir to create a first fluid quantity signal; in response to the first fluid quantity signal, maintaining a predetermined amount of the fluid in the first pressurized reservoir by pumping the fluid into the first pressurized reservoir and/or removing the fluid from the first pressurized reservoir using the first peristaltic fluid pump; pumping the fluid from the first pressurized reservoir to a second pressurized reservoir using a second peristaltic fluid pump; sensing an amount of the fluid in the second pressurized reservoir to create a second fluid quantity signal; in response to the second fluid quantity signal, maintaining a predetermined amount of the fluid in the second pressurized reservoir by pumping the sheath fluid into the second pressurized reservoir using the second peristaltic pump and/or removing the fluid from the second pressurized reservoir in response to the second sheath fluid quantity signal; supplying air to the first pressurized reservoir so as to pressurize the first pressurized reservoir; communicating air from the first pressurized reservoir to the second pressurized reservoir using a peristaltic air pump to pressurize air in the second reservoir to a predetermined air pressure; and maintaining the predetermined air pressure in the second reservoir by communicating air into the second pressurized reservoir using the peristaltic air pump.

Also provided are systems for generating a low-pulsatility fluid flow, comprising: a first peristaltic fluid pump; a first pressurized reservoir configured to receive a fluid from the first peristaltic pump; a first fluid sensor that generates a first fluid quantity signal in response to an amount of the fluid in the first pressurized reservoir and, the system being configured to modulate the operation of the first peristaltic fluid pump at least partially in response to the first fluid quantity signal so as to maintain a predetermined amount of fluid in the first pressurized reservoir; a second peristaltic fluid pump configured to pump the fluid from the first pressurized reservoir; a second pressurized reservoir that receives the fluid from the second peristaltic pump; a second fluid sensor that generates a second fluid quantity signal in response to an amount of the fluid in the second pressurized reservoir, the system being configured to modulate the operation of the second peristaltic fluid pump at least partially in response to the second fluid quantity signal so as to maintain a predetermined amount of fluid in the second pressurized reservoir; and a peristaltic air pump configured to pump air between the first pressurized reservoir and the second pressurized reservoir.

Additionally disclosed are methods, comprising operating a system according to the present disclosure, e.g., according to any one of Aspects 24-42.

Further provided are methods, comprising performing flow cytometry with a fluid delivered from a system according to the present disclosure, e.g., any one of Aspects 24-42.

Also disclosed are methods, comprising: with a fluidic circuit comprising (i) a first pressurized reservoir having at least some of a liquid disposed therein, (ii) a second pressurized reservoir having at least some of the liquid disposed therein, (iii) a pump configured to communicate air between the first pressurized reservoir and the second pressurized reservoir, and (iv) a pump configured to communicate the fluid between the first pressurized reservoir and the second pressurized reservoir, modulating the air communicated to and/or withdrawn from the first pressurized reservoir and the second pressurized reservoir and modulating the fluid communicated to and/or withdrawn from the first pressurized reservoir and the second pressurized reservoir; the modulating being performed so as to maintain the second pressurized reservoir at a pressure of within about 1% of a pressure of the first pressurized reservoir.

BRIEF DESCRIPTION OF THE DRAWINGS

In the drawings, which are not necessarily drawn to scale, like numerals may describe similar components in different views. Like numerals having different letter suffixes can represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" can include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints (e.g., "between 2 grams and 10 grams, and all the intermediate values includes 2 grams, 10 grams, and all intermediate values"). The endpoints of the ranges and any values disclosed herein are not limited to the precise range or value; they are sufficiently imprecise to include values approximating these ranges and/or values. All ranges are combinable.

As used herein, approximating language can be applied to modify any quantitative representation that can vary without resulting in a change in the basic function to which it is related. Accordingly, a value modified by a term or terms, such as "about" and "substantially," may not be limited to the precise value specified, in some cases. In at least some instances, the approximating language can correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" can refer to plus or minus 10% of the indicated number. For example, "about 10%" can indicate a range of 9% to 11%, and "about 1" can mean from 0.9-1.1. Other meanings of "about" can be apparent from the context, such as rounding off, so, for example "about 1" can also mean from 0.5 to 1.4. Further, the term "comprising" should be understood as having its open-ended meaning of "including," but the term also includes the closed meaning of the term "consisting." For example, a composition that comprises components A and B can be a composition that includes A, B, and other components, but can also be a composition made of A and B only. Any documents cited herein are incorporated by reference in their entireties for any and all purposes.

FIGURES

The following descriptions of the non-limiting figures are exemplary only and do not limit the scope of the present disclosure or the appended claims.

Figure 1:
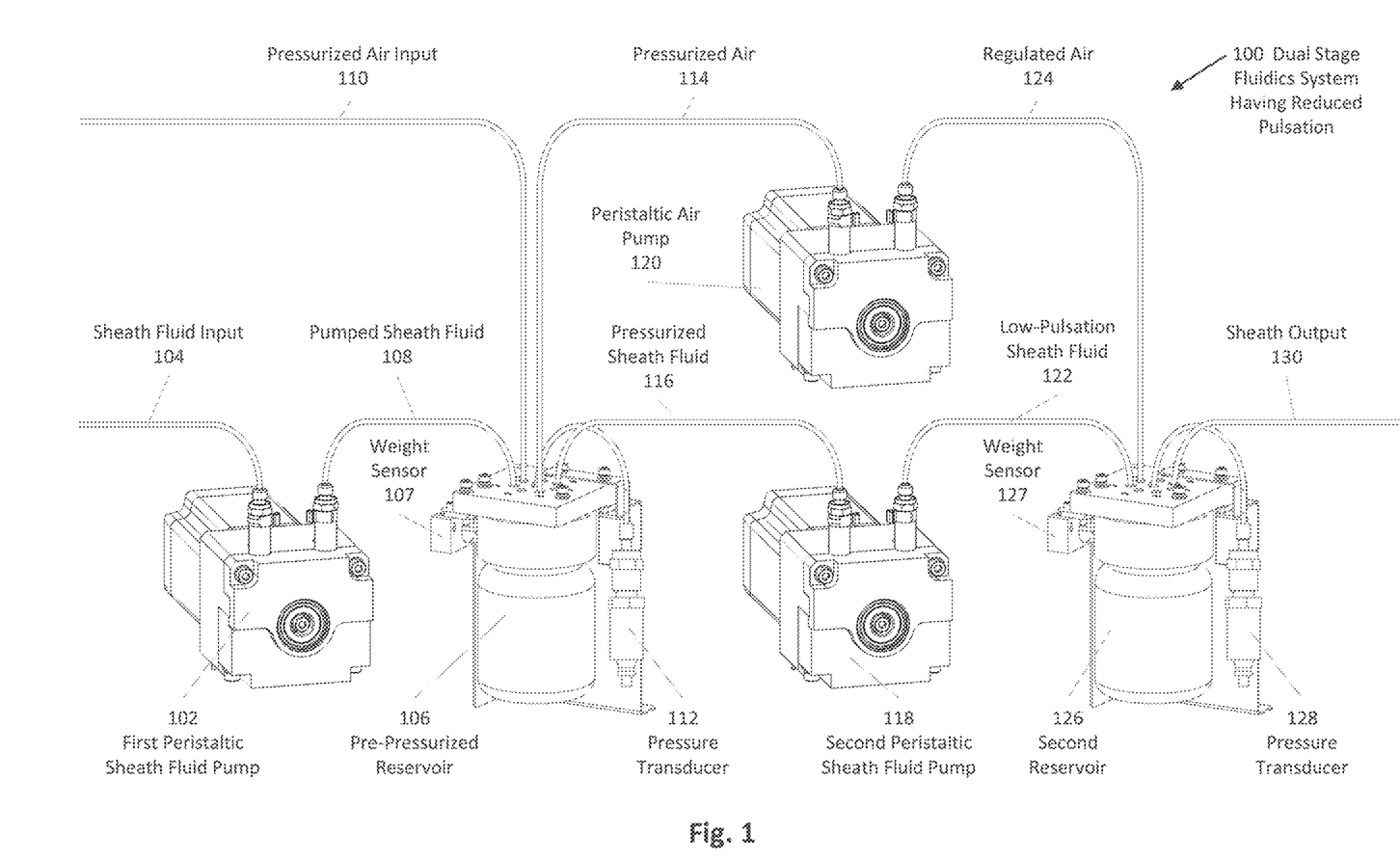
FIG. 1 is a schematic illustration of an embodiment of dual-stage fluidics system having reduced pulsation.

FIG. 1 is an illustration of a dual-stage fluidics system 100 having reduced pulsation in the sheath output 130. The system of FIG. 1 can be used in sorting flow cytometers that require a very stable delivery of sheath fluid to maintain accuracy in sort timing, as well as preventing pulsations in either the measured signal or the frequency of particles arriving at the interrogation area of the sorting flow cytometer. Peristaltic pumps are used in various types of instrumentation, especially in the medical field since peristaltic pumps isolate the fluid from any type of outside contamination. Peristaltic pumps are relatively inexpensive and are capable of creating pressures from 0-60 pounds per square inch (PSI) or higher. Peristaltic pumps are also very reliable and have relatively long lifetimes. Because of the low cost and the other advantages of using peristaltic pumps, various attempts have been made to create pulsation dampeners for peristaltic pumps. However, these dampeners have failed to eliminate or significantly reduce the inherent pulsatile output of the peristaltic pumps. Peristaltic pumps operate by using rollers that compress tubing and rotate along a length of the tubing to create a pumping action. As such, the pumping action creates waves of pressure in the pumped fluid as rollers lift at the end of the tubing length.

Dampening can be achieved, to some extent, using a reservoir in which sheath fluid can be pumped to a certain level and air provided to the reservoir at a pre-determined pressure using an air pump and an air regulator to maintain a predetermined pressure, which causes the sheath fluid to flow out from the reservoir at that pressure. Although such a system can provide a fairly stable flow of sheath fluid, air regulators are expensive and operate by using bleed air to maintain accuracy of the pressure of the regulated air. The amount of bleed air is controlled by an orifice. The use of larger orifices allows for greater responsiveness. However, larger orifices result in a larger amount of air utilized. As a result, to obtain a supply of highly regulated air, larger, more complex and expensive pumps would be required, and the vibrations created by the pumps would also have to be managed to not interfere with vibrations that can alter the sorting process when used in sorting flow cytometers.

On the other hand, peristaltic pumps are much less expensive and have virtually no vibration. Using a peristaltic pump for pumping air instead of an expensive air pump that vibrates, solves the problem of the vibration and allows the air pressure in the reservoir to be carefully maintained since the peristaltic pump can be operated in both the forward and reverse direction so that air can be added or subtracted in a precise manner in a reservoir without bleeding air through an air regulator. However, because peristaltic pumps have a pulsatile nature, the use of peristaltic pumps to pump both air and sheath fluid requires a reservoir that is very large to create a sufficient amount of dampening to provide a sheath output flow that is suitable for use in a sorting flow cytometer. For example, if a reservoir is pressurized to 60 psi, a reservoir of at least 25 liters would be required to provide sufficient dampening. Such a reservoir is, however, entirely too large for a sorting flow cytometer.

Referring again to FIG. 1, a dual-stage fluidics system 100 is illustrated which uses two reservoirs, i.e., a pre-pressurized reservoir 106 and a second reservoir 126 and three peristaltic pumps 102, 118 and 120. Peristaltic pumps 102, 118, 120 are used to provide a reliable system for pumping both air and sheath fluid to create a stable sheath output 130. By using two reservoirs, that are both pressurized, and in the best case, are pressurized to about the same pressure, the pulsatile nature of the peristaltic pumps has very little effect on the stability of the sheath output 130. About the same pressure is considered to be approximately 1.0% of the pressure.

As illustrated in FIG. 1, sheath fluid input 104 flows to a first peristaltic sheath fluid pump 102. The first peristaltic sheath fluid pump 102 pumps the sheath fluid input 104 and creates a pumped sheath fluid 108. The pumped sheath fluid 108 is transferred to a pre-pressurized reservoir 106. A weight sensor 107 measures that weight of the pre-pressurized reservoir 106 and a computerized control system 151 (FIG. 4) controls the flow of pumped sheath fluid 108 into the pre-pressurized reservoir 106. Weight sensor 107 generates a weight signal that is used to control the first peristaltic sheath fluid pump 102 to either pump additional fluid into the pre-pressurized reservoir 106 or remove fluid from the pre-pressurized reservoir 106. Since the first peristaltic sheath fluid pump 102 can operate in either direction, i.e., it can either pump fluid into the pre-pressurized reservoir 106 or remove sheath fluid from the pre-pressurized reservoir 106 with a high degree of precision, the amount or weight of the pre-pressurized fluid in the pre-pressurized reservoir can be maintained with a high degree of precision. Alternatively, first peristaltic sheath fluid pump can simply be operated to add sheath fluid carefully and stop pumping when weight sensor 107 indicates that the proper weight of sheath fluid is contained in the pre-pressurized reservoir 106. The pre-pressurized reservoir 106 therefore contains a pre-determined amount of sheath fluid which fills the pre-pressurized reservoir 106 to a pre-determined level. The remaining volume of the pre-pressurized reservoir 106 is filled with pressurized air from the pressurized air input 110. By maintaining a substantially constant level of sheath fluid in the pre-pressurized reservoir 106, the volume in the pre-pressurized reservoir 106 for the pressurized air remains substantially constant, which allows for easier maintenance of air pressure in pre-pressurized reservoir 106 and provides for a more constant total output pressure given that output pressure of a reservoir is related to the air pressure combined with the height of the fluid.

As illustrated in FIG. 1, weight sensor 107 measures the weight of the pre-pressurized reservoir 106 and provides signals to the first peristaltic sheath fluid pump 102 through a computer control system 150 which causes the first peristaltic sheath fluid pump 102 to either add sheath fluid 108 or remove sheath fluid from the pre-pressurized reservoir 106 to maintain a constant weight of sheath fluid in the pre-pressurized reservoir 106. Pressure transducer 112 carefully measures the air pressure in the pre-pressurized reservoir 106, and the pressurized air input 110 is adjusted to maintain pressurized air at a pre-determined pressure, such as 60 PSI with a delta of 0.25 PSI. Since the volume in the pre-pressurized reservoir 106 remains constant, it is easier to maintain a constant air pressure, as indicated above. The pressurized air input 110 is created by the air supply system 150 of FIG. 3, which is explained in more detail below.

It has also been discovered that variations in air pressure are created by peristaltic pumps, such as peristaltic air pump 120, when the input pressure of the air, such as from pressurized air 114, is substantially different from the pressure of the output regulated air 124. This is a result of the pulsatile nature of the peristaltic pumps and the fact that when a peristaltic pump is pumping from an unpressurized or low pressured source, the tubing expands and contracts causing a change in volume which causes the pressure to vary. This variation in volume of the plastic tubing occurs even when very stiff tubing is utilized. However, it has been discovered that when the input air, such as pressurized air 114, is at substantially the same pressure as the regulated air 124, i.e., within 1.0%, expansion and contraction of the tubing is minimal. For example, if the pressurized air 114 is 60 PSI with a variance of 0.25 PSI, it has been found that the pressure of the regulated air 124 can be maintained at 60 PSI, with a variance of much less than 0.25 PSI, perhaps as low as 0.001 PSI, without substantial changes in pressure caused by the tubing.

The pressurized air 114 is the pressurized air that exists in the pre-pressurized reservoir 106 that is provided by pressurized air input 110. Pressurized air 114 is therefore at the same level as the pressurized air input 110 which, for example, can be 60 PSI. The pressurized air 114 is the input to the peristaltic air pump 120. The output of the peristaltic air pump 120 is the regulated air 124. In an ideal embodiment, the pressurized air 114 would have the same pressure as the pressure of the regulated air 124, i.e., within about 1.0%. However, this may not be the case. The air pressure of the pressurized air 114 can be significantly different than the air pressure of regulated air 124 in various embodiments of the disclosed technology. The magnitude of the difference will affect the magnitude of the fluctuations in pressure at the sheath output 130. Accordingly, the pressure in the pre-pressurized reservoir can be any pressure above ambient pressure and the variations in pressure at the sheath output 130 will be reduced as the pressure in pre-pressurized reservoir 106 increases to the pressure of the regulated air 124. Again, however, an especially suitable pressure for pre-pressurized reservoir 106, to minimize fluctuations in pressure in sheath output 130, is the same pressure as the regulated air 124. Without being bound to any particular theory or embodiment, pulsation can be measured directly by pressure variations in reservoir 126 or output 130, or by observing velocity shifts in the flow of the fluid after the fluid leaves output 130. Pressure measurement is particularly convenient, as transducer 128 is already monitoring the pressure of reservoir 126.

Referring again to FIG. 1, the peristaltic pump 120 functions to isolate the pressurized air 114 from the regulated air 124. The pressure transducer 112 detects the air pressure of the air inside of the pre-pressurized reservoir 106. If the air pressure drops below a pre-determined threshold, the computer control system 151, connected to the pressure transducer 112, will generate a control signal that is sent to the air supply system 150 of FIG. 3, to supply additional air through the pressurized air input 110, as explained below with regard to FIG. 4. If the pressure in the pre-pressurized reservoir 106 is too high, pressure is removed by the dump valve 142 (FIG. 3), which is disclosed in more detail with respect to the description of FIG. 3. As such, the pre-pressurized air 114 is ideally substantially the same pressure (i.e., within ±0.25 PSI at 60 PSI) or about 0.4% as the air pressure in the pre-pressurized reservoir 106, to create a fairly constant output pressure of sheath output 130. Using the systems disclosed herein, testing has shown that a variation of only 0.25 PSI can be maintained with a pressure of 60 PSI in the pre-pressurized reservoir 106. Differences in pressure of less than 1.0% are considered to be about or substantially the same. Alternatively, a dump valve can be connected to second reservoir 126 to lower the pressure in second reservoir 126.

As also illustrated in FIG. 1, the regulated air 124 is then applied to the second reservoir 126. A pressure transducer 128 reads the pressure in the second reservoir 126 and transmits that reading to computer control system 151. If the regulated air 124 is too high, the peristaltic pump 120 is operated in reverse to remove air from the second reservoir 126. In this manner, there is no loss of efficiency, such as when an air regulator is used, which causes a large amount of air to be bled from the system and requires large expensive motors that are capable of supplying a large amount of air.

The pressurized sheath fluid 116, illustrated in FIG. 1, is pumped from the pre-pressurized reservoir 106 by second peristaltic sheath fluid pump 118. The second peristaltic sheath fluid pump 118 pumps the pressurized sheath fluid 116 from the pre-pressurized reservoir 106 to the second reservoir 126 to create a low-pulsation sheath fluid 122. Second peristaltic sheath fluid pump 118 can either operate in both a forward and reverse direction, to either add to, or subtract from, sheath fluid in the second reservoir 126, or can operate in just a forward direction to just add sheath fluid to second reservoir 126. In the latter case, sheath fluid is added to the second reservoir until weight sensor 127 indicates that a predetermined level has been reached. Threshold values can be set very tightly so that the level of sheath fluid in the second reservoir 126 is precisely maintained. The pressurized sheath fluid 116 can be pressurized at 60 PSI, or any desired level, and has a very low fluctuation in pressure, e.g., 0.25 PSI. Since the pressurized sheath fluid 116 is pressurized to a level that is substantially the same as the pressurization of a low-pulsation sheath fluid 122, very little fluctuation occurs between the pressurized sheath fluid 116 and the low-pulsation sheath fluid 122 because there is very little difference between the input pressure of the pressurized sheath fluid 116 and the output pressure of the low-pulsation sheath fluid 122. Again, the lower the difference, the more stable the sheath output 130. In addition, the second peristaltic sheath fluid pump 128 isolates the input and output so that variations in the pressurized sheath fluid 116 are not transmitted to the low-pulsation sheath fluid 122.

As also illustrated in FIG. 1, the low-pulsation sheath fluid 122 is transmitted to the second reservoir 126. The second reservoir 126 is filled to a pre-determined amount as indicated by the weight sensor 127. By filling the second reservoir 126 with sheath fluid to a pre-determined amount or pre-determined level, a specific volume is maintained in the second reservoir 126 for pressurized air. Since the volume remains substantially constant, i.e., within 1.0%, a substantially constant pressure can be maintained in an easier manner. In that regard, the head pressure of the sheath fluid remains substantially constant so that variations in the overall pressure in second reservoir 126 are not attributable to changes in the head pressure. Regulated air 124 is applied to the second reservoir and creates an air pressure that is detected by the pressure transducer 128. If the air pressure in the second reservoir 126 is too high, the pressure transducer, transmits a signal to the computer control system 151 (FIG. 4) which generates a control signal 178 to control peristaltic air pump 120, which can operate in either direction to add additional air or to subtract air from the second reservoir 126. In this manner, the air pressure in the second reservoir 126 can be very closely monitored and maintained to create a sheath output 130 that is very stable and has a very consistent pressure and flow output. Alternatively, a dump valve can be used, such as dump valve 129, illustrated in FIG. 2, to maintain the air pressure in second reservoir 126, and peristaltic air pump 120 is not operated in a reverse direction.

Figure 2:
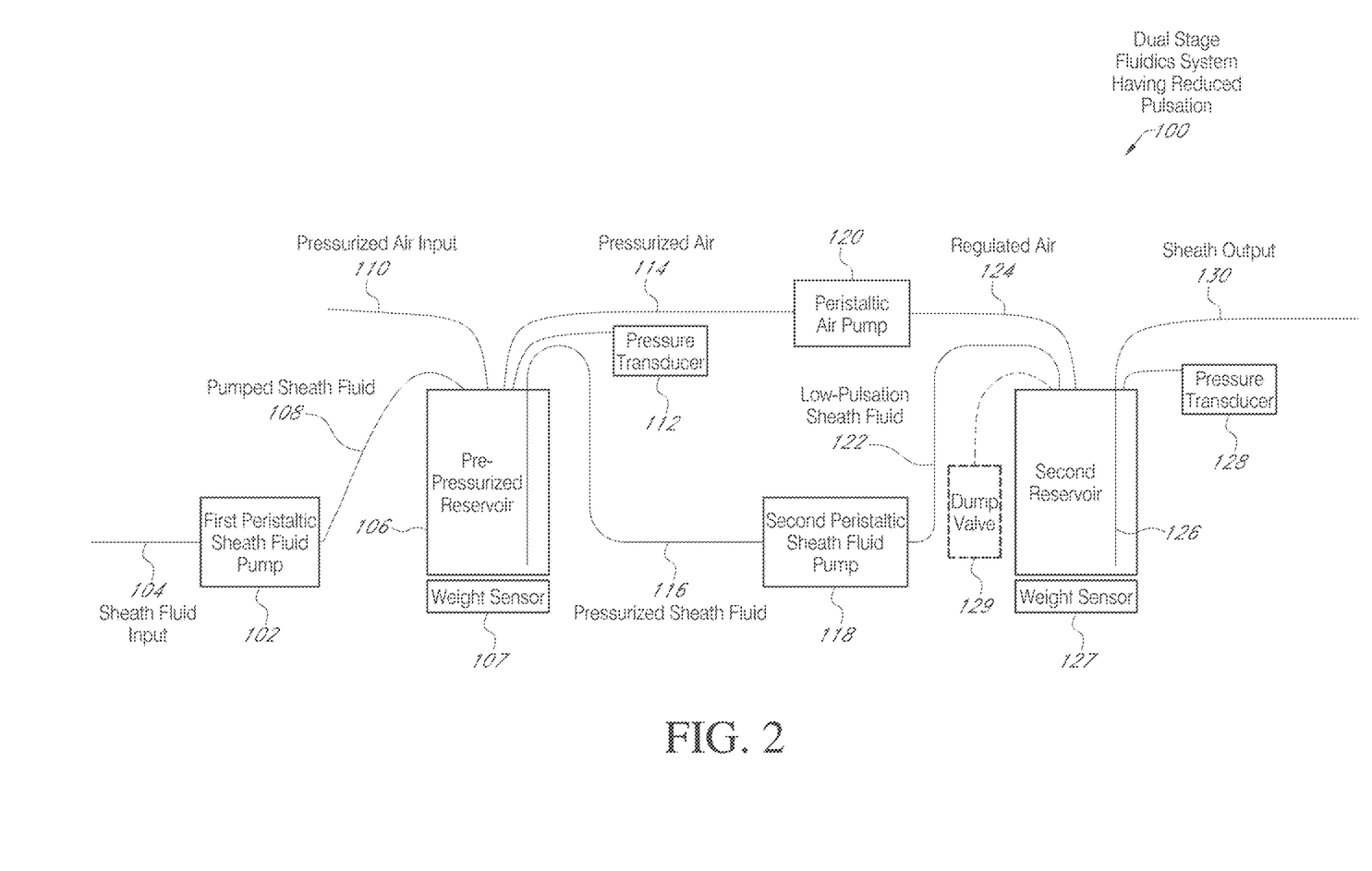
FIG. 2 is a schematic flow diagram that illustrates the operation of the dual-stage fluidics system of the embodiment of FIG. 1.

FIG. 2 discloses a schematic flow diagram of a dual-stage fluidics system 100 that corresponds to the embodiment disclosed in FIG. 1. As illustrated in FIG. 2, sheath fluid input 104 provides sheath fluid to a first peristaltic sheath fluid pump 102. The pumped sheath fluid 108 is transferred through tubing to a pre-pressurized reservoir 106. Weight sensor 107 detects the weight of the pre-pressurized reservoir 106 and generates a weight signal that is used to control the first peristaltic sheath fluid pump 102 to maintain a pre-determined amount of sheath fluid in the pre-pressurized reservoir 106. Since the first peristaltic sheath fluid pump 102 can either add or subtract fluid by operating in a forward or a reverse direction, the amount of sheath fluid in the pre-pressurized reservoir 106 can be maintained with a high degree of accuracy. Pressurized air input 110 is provided to the pre-pressurized reservoir 106. Since the pre-pressurized reservoir 106 contains a pre-determined amount of sheath fluid, a constant volume of space is provided in the pre-pressurized reservoir 106 for the pressurized air input 110. The pressure transducer 112 detects the air pressure in pre-pressurized reservoir 106 and creates a pressure signal that is used to control the pressurized air input 110. The pressurized air in the pre-pressurized reservoir 106 is supplied to peristaltic air pump 120. The pressurization of the pressurized air 114 is ideally substantially the same pressurization as the regulated air 124 but can be at any pressurization to reduce variations in pressure of sheath output 130. Peristaltic air pump 120 can therefore supply air to the second reservoir 126 by simply adding additional air or subtracting air without changing the air pressure substantially from the input air pressure of the pressurized air 114 to the regulated air 124. Alternatively, a dump valve 129 can be used to reduce air pressure in second reservoir 126. The regulated air 124 is applied to the second reservoir 126. Second reservoir 126 maintains a substantially constant volume for the regulated air 124.

As also illustrated in FIG. 2, the pressurized sheath fluid 116 flows from the pre-pressurized reservoir 106 to the second peristaltic sheath pump 118. The pressurized sheath fluid 116 has a pressure that is substantially the same as the low-pulsation sheath fluid 122 so that the second peristaltic sheath pump 118 pumps sheath fluid from an input to an output that is substantially the same pressure. Again, the pressure of the pressurized sheath fluid can be any pressure, but the closer the pressure of the pressurized sheath fluid to the low-pulsation sheath fluid 122, the lower the variations in the pressure of sheath output 130. When the pressures are about the same, the low-pulsation sheath fluid 122 has low pressure variations. For example, at pressures of 60 PSI, variations of only 0.001 PSI can be achieved in the low-pulsation sheath fluid 122 since the second peristaltic sheath pump 118 is pumping from an input pressure to an output pressure that are substantially the same. In this context, substantially the same means that the input pressure and the output pressure do not vary more than about 1.0% to obtain good results. The low-pulsation sheath fluid 122 is transferred to the second reservoir 126. Weight sensor 127 measures the weight of the sheath fluid in the second reservoir 126 which is used to generate control signals that control the second peristaltic sheath fluid pump 118, as explained in more detail with respect to the description of FIG. 4. Pressure transducer 128 detects the air pressure within the second reservoir 126 and generates an air pressure signal which is utilized by a computer control system 151 (FIG. 4) that controls a peristaltic air pump 120. The air pressure within the second reservoir 126 can therefore be controlled to create variances less than 0.001 PSI at 60 PSI in the second reservoir 126 so that the sheath output 130 is stable and constant.

Figure 3:
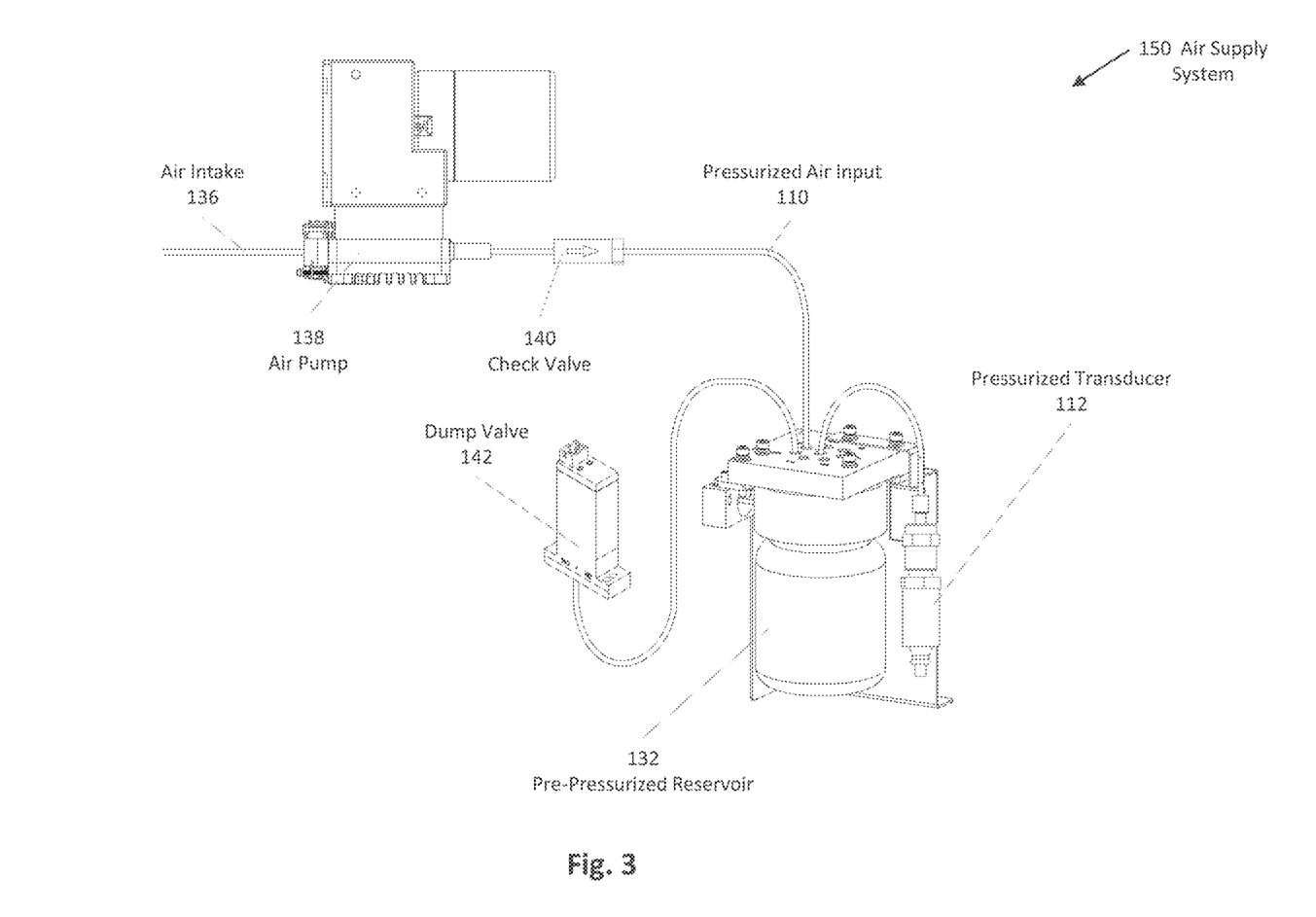
FIG. 3 is a schematic diagram of an embodiment of an air supply system for supplying pressurized air to a pre-pressurized reservoir.

FIG. 3 is a schematic diagram of an air supply system 150. The air supply system 150 is capable of bringing the pressurized air input 110 up to a pressure of 60 PSI or other similar pressure in a short period of time for the volume of air in the pre-pressurized reservoir 132. Using a peristaltic pump to supply the pressurized air input 110 is not a viable alternative since it would take a substantial amount of time to supply the volume of air for the pre-pressurized reservoir 132 using a peristaltic pump. For example, typical implementations would require on the order of an hour or two of pumping before the pressure could be raised to 60 PSI in a pre-pressurized reservoir 132 using a peristaltic pump. As such, a higher volume air pump, such as air pump 138, is required. Air pump 138, however, is substantially smaller than air pumps that operate with air regulators that require bleed air to maintain accuracy. As such, air pump 138 is substantially smaller, provides substantially less vibration and can supply a sufficient amount of air to raise the pressurized air input 110 to a desired pressure, such as, for example, 60 PSI, in less than a minute or in just a few minutes. Smaller air pumps such as air pump 138 create less vibration than air pumps that operate with air regulators. Air pump 138, however, must be sized so that it only operates on an intermittent basis and does not create sufficient vibration that interfere with a sorting process performed by a sorting flow cytometer. Air pump 138 has an air intake 136, at ambient pressure, and pumps the pressurized air through check valve 140. Check valve 140 prevents the pressurized air input 110 from flowing back through the air pump and reducing the pressure of the pressurized air input 110. The pressure transducer 112 reads the pressure in the pre-pressurized reservoir 132 and generates an air pressure signal that is used to control the air pump 138, as well as the dump valve 142. When the pressure is low, the air pump 138 is activated to increase the pressure of the pressurized air input 110. If the pressurized transducer 112 detects an air pressure that is greater than a pre-determined threshold pressure, for example, 60.25 PSI, then dump valve 142 is activated to carefully reduce the pressure to a pressure that is within the threshold values of the desired pressure, for example, 60 PSI plus 0.25 PSI. In this manner, the pre-pressurized reservoir 132 can be maintained at a substantially constant level and can be pressurized in a relatively short time period using an air pump 138 that does not create excessive vibration.

Figure 4:
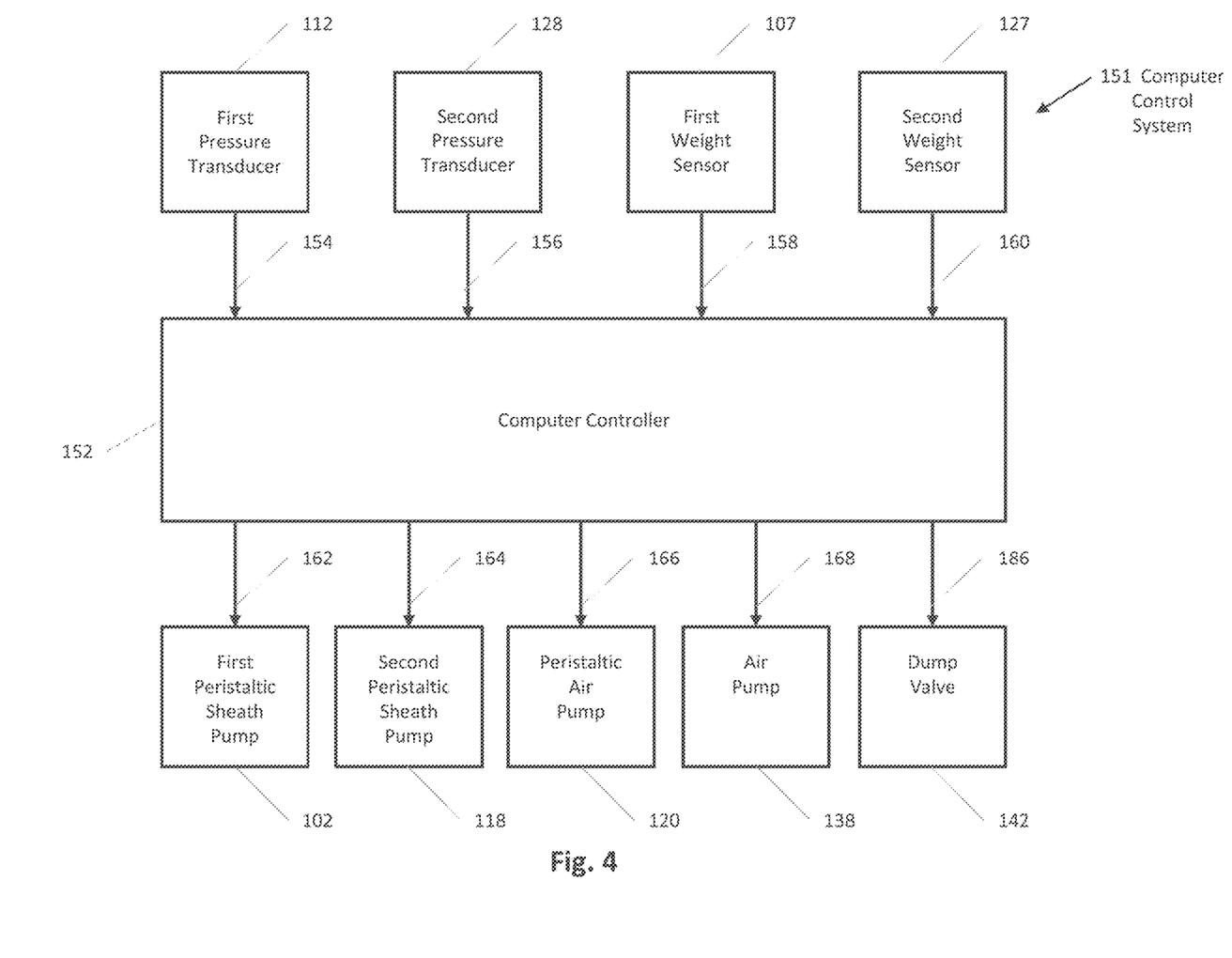
FIG. 4 is a schematic block diagram of a control system that can be utilized with the disclosed embodiments.

FIG. 4 is a schematic block diagram of a computer control system 151. As illustrated in FIG. 4, first pressure transducer 112 generates a first pressure signal 154 which is applied to the computer controller 152. Second pressure transducer 128 generates a second pressure signal 156 that is applied to computer controller 152. First weight sensor 107 generates a first weight signal 158 that is applied to the computer controller 152. A second weight sensor 127 generates a second weight signal 160 that is applied to the computer controller 152. The computer controller uses each one of these signals to generate control signals. Computer controller 152 generates a control signal 162 to control the first peristaltic sheath pump 102. Computer controller 152 generates a control signal 164 to control the second peristaltic sheath pump 118. Computer controller 152 generates a control signal 166 that controls the peristaltic air pump 120. Computer controller 152 generates a control signal 168 that controls air pump 138. Computer controller 152 generates a control signal 186 that is used to control the dump valve 142.

In this manner, each of the signals detected by the transducers and sensors is utilized to control the sheath pumps, air pumps and dump valve to create a steady and uniform sheath output flow 130.

Accordingly, the embodiments of the disclosed technology can provide a sheath fluid output that is very stable and utilizes peristaltic pumps that can operate in either direction for both sheath fluid and air to maintain a highly constant and stable sheath output. Two pressurized reservoirs are used which are maintained with a pre-determined amount of sheath fluid which is carefully maintained by two different peristaltic sheath fluid pumps. Highly accurate air pressures are maintained in the two pressurized reservoirs which is assisted by the fact that a constant volume of air space is maintained within both of the reservoirs. In addition, a peristaltic air pump is provided between the two reservoirs which isolates the air pressure of the first reservoir from the second reservoir. Since the first pressurized reservoir is maintained at about the same pressure as the second pressurized reservoir, the peristaltic air pump functions to simply provide or subtract an amount of pressurized air to or from the second reservoir and does not need to substantially adjust the pressure between the two reservoirs. Alternatively, a dump valve can be connected to the second reservoir to lower pressure in the second reservoir when the pressure in the second reservoir exceeds a predetermined threshold. In this manner, a constant and very stable output of sheath fluid can be provided.

Aspects

The following Aspects are illustrative only and do not serve to limit the scope of the present disclosure or the appended claims.

Aspect 1. A method of generating a low-pulsatility fluid flow, comprising: pumping a fluid into a first pressurized reservoir using a first peristaltic fluid pump; sensing an amount of the fluid in the first pressurized reservoir to create a first fluid quantity signal; in response to the first fluid quantity signal, maintaining a predetermined amount of the fluid in the first pressurized reservoir by pumping the fluid into the first pressurized reservoir and/or removing the fluid from the first pressurized reservoir using the first peristaltic fluid pump; pumping the fluid from the first pressurized reservoir to a second pressurized reservoir using a second peristaltic fluid pump; sensing an amount of the fluid in the second pressurized reservoir to create a second fluid quantity signal; in response to the second fluid quantity signal, maintaining a predetermined amount of the fluid in the second pressurized reservoir by pumping the sheath fluid into the second pressurized reservoir using the second peristaltic pump and/or removing the fluid from the second pressurized reservoir in response to the second sheath fluid quantity signal; supplying air to the first pressurized reservoir so as to pressurize the first pressurized reservoir; communicating air from the first pressurized reservoir to the second pressurized reservoir using a peristaltic air pump to pressurize air in the second reservoir to a predetermined air pressure; and maintaining the predetermined air pressure in the second reservoir by communicating air into the second pressurized reservoir using the peristaltic air pump.

Aspect 2. The method of Aspect 1, wherein maintaining the predetermined air pressure in the second pressurized reservoir further comprises maintaining the predetermined pressure in the second pressurized reservoir by removing air from the second pressurized reservoir using the peristaltic air pump.

Aspect 3. The method of any one of Aspects 1-2, wherein supplying air to the first pressurized reservoir comprises supplying air to the first pressurized reservoir at an air pressure that is substantially the same as the predetermined pressure.

Aspect 4. The method of any one of Aspects 1-3, wherein sensing an amount of the fluid in the first pressurized reservoir comprises weighing the first pressurized reservoir using a first weight sensor to give rise to the first fluid quantity signal.

Aspect 5. The method of any one of Aspects 1-4, wherein maintaining a predetermined amount of the fluid in the first pressurized reservoir comprises, in response to the first fluid quantity signal, pumping the fluid into the first pressurized reservoir and removing the fluid from the first pressurized reservoir with the peristaltic fluid pump.

Aspect 6. The method of any one or Aspects 1-5, wherein sensing an amount of the fluid in the second pressurized reservoir comprises weighing the second pressurized reservoir using a second weight sensor to give rise to the second fluid quantity signal.

Aspect 7. The method of any one of Aspects 1-6, wherein maintaining the predetermined amount of the fluid in the second pressurized reservoir comprises, in response to the second fluid quantity signal, pumping the fluid into the second pressurized reservoir and removing fluid from the second pressurized reservoir using the second peristaltic fluid pump.

Aspect 8. The method of any one of Aspects 1-7, further comprising detecting an air pressure in the first pressurized reservoir using a first pressure transducer and generating a first air pressure transducer signal from the first pressure transducer.

Aspect 9. The method of Aspect 8, further comprising modulating operation of the peristaltic air pump at least partially in response to the first air pressure transducer signal.

Aspect 10. The method of any one of Aspects 8-9, further comprising modulating operation of a release valve in fluid communication with the first reservoir at least partially in response to the first air pressure transducer signal.

Aspect 11. The method of any one of Aspects 1-10, further comprising detecting an air pressure in the second pressurized reservoir using a second pressure transducer and generating a second air pressure transducer signal from the second pressure transducer.

Aspect 12. The method of Aspect 11, further comprising modulating operation of the peristaltic air pump at least partially in response to the second air pressure transducer signal.

Aspect 13. The method of any one of Aspects 11-12, wherein maintaining the predetermined air pressure in the second pressurized reservoir comprises opening a release valve in fluid communication with the second reservoir at least partially in response to the second air pressure transducer signal.

Aspect 14. The method of any one of Aspects 1-13, further comprising modulating operation of a third fluid pump at least partially in response to the second fluid quantity signal, the third fluid pump configured to remove fluid from the second pressurized reservoir.

Aspect 15. The method of any one of Aspects 1-14, further comprising modulating operation of the first peristaltic fluid pump at least partially in response to the second fluid quantity signal.

Aspect 16. The method of any one of Aspects 1-15, further comprising modulating operation of the second peristaltic fluid pump at least partially in response to the first fluid quantity signal.

Aspect 17. The method of any one of Aspects 1-16, further comprising modulating operation of a valve so as to deliver input air to the first pressurized reservoir.

Aspect 18. The method of Aspect 17, wherein the input air is pressurized by a boost pump.

Aspect 19. The method of any one of Aspects 1-18, wherein air exiting the first pressurized reservoir is at a pressure of within about 1% of the pressure of air entering the second pressurized reservoir.

Aspect 20. The method of Aspect 19, wherein air exiting the first pressurized reservoir is at a pressure of within about 0.5% of the pressure of air entering the second pressurized reservoir.

Aspect 21. The method of any one of Aspects 1-20, wherein fluid exiting the first pressurized reservoir is at a pressure of within about 5% of the pressure of fluid entering the second pressurized reservoir.

Aspect 22. The method of Aspect 21, wherein fluid exiting the first pressurized reservoir is at a pressure of within about 1% of the pressure of fluid entering the second pressurized reservoir.

Aspect 23. The method of any one of Aspects 1-22, wherein the fluid is a sheath fluid and further comprising communicating the sheath fluid from the second pressurized reservoir to a flow cytometer.

Aspect 24. A system for generating a low-pulsatility fluid flow, comprising: a first peristaltic fluid pump; a first pressurized reservoir configured to receive a fluid from the first peristaltic pump; a first fluid sensor that generates a first fluid quantity signal in response to an amount of the fluid in the first pressurized reservoir and, the system being configured to modulate the operation of the first peristaltic fluid pump at least partially in response to the first fluid quantity signal so as to maintain a predetermined amount of fluid in the first pressurized reservoir; a second peristaltic fluid pump configured to pump the fluid from the first pressurized reservoir; a second pressurized reservoir that receives the fluid from the second peristaltic pump; a second fluid sensor that generates a second fluid quantity signal in response to an amount of the fluid in the second pressurized reservoir, the system being configured to modulate the operation of the second peristaltic fluid pump at least partially in response to the second fluid quantity signal so as to maintain a predetermined amount of fluid in the second pressurized reservoir; and a peristaltic air pump configured to pump air between the first pressurized reservoir and the second pressurized reservoir.

Aspect 25. The system of Aspect 24, wherein the system is configured such that the peristaltic air pump operates to maintain the first pressurized reservoir and the second pressurized reservoir at substantially the same pressure.

Aspect 26. The system of any one of Aspects 24-25, wherein the first fluid sensor is configured to weigh the first pressurized reservoir.

Aspect 27. The system of any one of Aspects 24-26, wherein the first fluid sensor is configured to determine a level of fluid in the first pressurized reservoir.

Aspect 28. The system of any one of Aspects 24-27, wherein the second fluid sensor is configured to weigh the second pressurized reservoir.

Aspect 29. The system of any one of Aspects 24-28, wherein the second fluid sensor is configured to determine a level of fluid in the second pressurized reservoir.

Aspect 30. The system of any one of Aspects 24-29, further comprising a first pressure transducer that generates a first air pressure signal in response to a pressure within the first pressurized reservoir.

Aspect 31. The system of any one of Aspects 24-30, further comprising a second pressure transducer that generates a second air pressure signal in response to a pressure within the second pressurized reservoir.

Aspect 32. The system of any one of Aspects 24-31, further comprising a first valve in fluid communication with the first pressurized reservoir.

Aspect 33. The system of Aspect 32, wherein the valve reduces air pressure in the first pressurized reservoir if the air pressure in the first pressurized reservoir exceeds a threshold pressure.

Aspect 34. The system of any one of Aspects 24-33, further comprising a second valve in fluid communication with the second pressurized reservoir.

Aspect 35. The system of Aspect 34, wherein the valve reduces air pressure in the second pressurized reservoir if the air pressure in the second pressurized reservoir exceeds a threshold pressure.

Aspect 36. The system of any one of Aspects 24-35, further comprising a boost pump configured to deliver air to the first pressurized reservoir.

Aspect 37. The system of Aspect 36, wherein the boost pump is operable to maintain a predetermined pressure in the first pressurized reservoir.

Aspect 38. The system of any one of Aspects 24-37, further comprising: a control signal generator, the control signal generator configured to generate a first peristaltic pump control signal in response to the first fluid quantity signal, which first peristaltic pump signal is used to modulate operation of the first peristaltic fluid pump to achieve a first predetermined amount of fluid in the first pressurized reservoir by pumping the fluid in a forward direction into the first pressurized reservoir and/or in a reverse direction out of the first pressurized reservoir, the control signal generator configured to generate a second peristaltic pump control signal in response to the second fluid quantity signal, which second peristaltic pump signal is used to modulate operation of the second peristaltic fluid pump to achieve a second predetermined amount of fluid in the second pressurized reservoir by pumping the fluid in a forward direction into the second pressurized reservoir and/or in a reverse direction out of the second pressurized reservoir, the control signal generator generating a peristaltic air pump control signal in response to a signal related to a pressure in at least one of the first pressurized reservoir and the second pressurized reservoir, which peristaltic air pump control signal is used to modulate operation of the peristaltic air pump to achieve a predetermined pressure in the second reservoir.

Aspect 39. The system of any one of Aspects 24-38, wherein the system is configured such that fluid entering the second peristaltic fluid pump defines a pressure $P_{entry}$, fluid exiting the second peristaltic pump defines a pressure $P_{exit}$, and $P_{exit}$ is within about 1% of the value of $P_{entry}$.

Aspect 40. The system of Aspect 39, wherein $P_{exit}$ is within about 0.5% of the value of $P_{entry}$.

Aspect 41. The system of any one of Aspects 24-40, further comprising a flow cytometer, the flow cytometer being in fluid communication with the second pressurized reservoir.

Aspect 42. The system of any one of Aspects 24-41, wherein the system is configured so as to maintain the second pressurized reservoir at a pressure of within about 1% of a pressure of the first pressurized reservoir.

Aspect 43. A method, comprising operating a system according to any one of Aspects 24-42.

Aspect 44. A method, comprising performing flow cytometry with a fluid delivered from a system according to any one of Aspects 24-42.

Aspect 45. A method, comprising: with a fluidic circuit comprising (i) a first pressurized reservoir having at least some of a liquid disposed therein, (ii) a second pressurized reservoir having at least some of the liquid disposed therein, (iii) a pump configured to communicate air between the first pressurized reservoir and the second pressurized reservoir, and (iv) a pump configured to communicate the fluid between the first pressurized reservoir and the second pressurized reservoir, modulating the air communicated to and/or withdrawn from the first pressurized reservoir and the second pressurized reservoir and modulating the fluid communicated to and/or withdrawn from the first pressurized reservoir and the second pressurized reservoir; the modulating being performed so as to maintain the second pressurized reservoir at a pressure of within about 1% of a pressure of the first pressurized reservoir.

Aspect 46. The method of Aspect 45, further comprising communicating at least some of the fluid from the second reservoir to a flow cytometer.

What is claimed:

1. A method of generating a low-pulsatility fluid flow, comprising:
   a. pumping a fluid into a first pressurized reservoir using a first peristaltic fluid pump;
   b. sensing an amount of the fluid in the first pressurized reservoir to create a first fluid quantity signal;
   c. in response to the first fluid quantity signal, maintaining a predetermined amount of the fluid in the first pressurized reservoir by pumping the fluid into the first pressurized reservoir and/or removing the fluid from the first pressurized reservoir using the first peristaltic fluid pump;
   d. pumping the fluid from the first pressurized reservoir to a second pressurized reservoir using a second peristaltic fluid pump;
   e. sensing an amount of the fluid in the second pressurized reservoir to create a second fluid quantity signal;
   f. in response to the second fluid quantity signal, maintaining a predetermined amount of the fluid in the second pressurized reservoir by pumping the fluid into the second pressurized reservoir using the second peristaltic pump and/or removing the fluid from the second pressurized reservoir in response to the second fluid quantity signal;
   g. supplying air to the first pressurized reservoir so as to pressurize the first pressurized reservoir;
   h. communicating air from the first pressurized reservoir to the second pressurized reservoir using a peristaltic air pump to pressurize air in the second pressurized reservoir to a predetermined air pressure; and
   i. maintaining the predetermined air pressure in the second reservoir by communicating air into the second pressurized reservoir using the peristaltic air pump.

2. The method of claim 1, wherein maintaining the predetermined air pressure in the second pressurized reservoir further comprises maintaining the predetermined air pressure in the second pressurized reservoir by removing air from the second pressurized reservoir using the peristaltic air pump.

3. The method of claim 1, wherein supplying air to the first pressurized reservoir comprises supplying air to the first pressurized reservoir at an air pressure that is substantially the same as the predetermined air pressure.

4. The method of claim 1, wherein sensing an amount of the fluid in the first pressurized reservoir comprises weighing the first pressurized reservoir using a first weight sensor to give rise to the first fluid quantity signal.

5. The method of claim 1, wherein maintaining a predetermined amount of the fluid in the first pressurized reservoir comprises, in response to the first fluid quantity signal, pumping the fluid into the first pressurized reservoir and removing the fluid from the first pressurized reservoir with the first peristaltic fluid pump.

6. The method of claim 1, wherein sensing an amount of the fluid in the second pressurized reservoir comprises weighing the second pressurized reservoir using a second weight sensor to give rise to the second fluid quantity signal.

7. The method of claim 1, wherein maintaining the predetermined amount of the fluid in the second pressurized reservoir comprises, in response to the second fluid quantity signal, pumping the fluid into the second pressurized reservoir and removing fluid from the second pressurized reservoir using the second peristaltic fluid pump.

8. The method of claim 1, further comprising detecting an air pressure in the first pressurized reservoir using a first pressure transducer, generating a first air pressure transducer signal from the first pressure transducer, and (a) modulating operation of the peristaltic air pump at least partially in response to the first air pressure transducer signal, or (b) modulating operation of a release valve in fluid communication with the first pressurized reservoir at least partially in response to the first air pressure transducer signal, or both (a) and (b).

9. The method of claim 1, further comprising detecting an air pressure in the second pressurized reservoir using a second pressure transducer, generating a second air pressure transducer signal from the second pressure transducer, and modulating operation of the peristaltic air pump at least partially in response to the second air pressure transducer signal.

10. The method of claim 1, wherein air exiting the first pressurized reservoir is at a pressure of within about 1% of the pressure of air entering the second pressurized reservoir.

11. The method of claim 1, wherein the fluid is a sheath fluid and further comprising communicating the sheath fluid from the second pressurized reservoir to a flow cytometer.

12. A system for generating a low-pulsatility fluid flow, comprising:
   a first peristaltic fluid pump;
   a first pressurized reservoir configured to receive a fluid from the first peristaltic fluid pump;
   a first fluid sensor that generates a first fluid quantity signal in response to an amount of the fluid in the first pressurized reservoir and,
      the system being configured to modulate operation of the first peristaltic fluid pump at least partially in response to the first fluid quantity signal so as to maintain a predetermined amount of fluid in the first pressurized reservoir;
   a second peristaltic fluid pump configured to pump the fluid from the first pressurized reservoir;
   a second pressurized reservoir that receives the fluid from the second peristaltic pump;
   a second fluid sensor that generates a second fluid quantity signal in response to an amount of the fluid in the second pressurized reservoir,
      the system being configured to modulate operation of the second peristaltic fluid pump at least partially in response to the second fluid quantity signal so as to maintain a predetermined amount of fluid in the second pressurized reservoir; and a peristaltic air pump configured to pump air between the first pressurized reservoir and the second pressurized reservoir.

13. The system of claim 12, wherein (a) the first fluid sensor is configured to weigh the first pressurized reservoir or determine a level of fluid in the first pressurized reservoir, or (b) wherein the second fluid sensor is configured to weigh the second pressurized reservoir or determine a level of fluid in the second pressurized reservoir, or (c) wherein the system is configured such that the peristaltic air pump operates to maintain the first pressurized reservoir and the second pressurized reservoir at substantially the same pressure, or any two or more of (a), (b), and (c).

14. The system of claim 12, further comprising (a) a first pressure transducer that generates a first air pressure signal in response to a pressure within the first pressurized reservoir, or (b) a second pressure transducer that generates a second air pressure signal in response to a pressure within the second pressurized reservoir, or both (a) and (b).

15. The system of claim 12, further comprising a first valve in fluid communication with the first pressurized reservoir, the first valve configured to reduce air pressure in the first pressurized reservoir if the air pressure in the first pressurized reservoir exceeds a threshold pressure.

16. The system of claim 12, further comprising a second valve in fluid communication with the second pressurized reservoir, the second valve configured to reduce air pressure in the second pressurized reservoir if the air pressure in the second pressurized reservoir exceeds a threshold pressure.

17. The system of claim 12, further comprising:
a. a control signal generator,
b. the control signal generator configured to generate a first peristaltic pump control signal in response to the first fluid quantity signal, which first peristaltic pump signal is used to modulate operation of the first peristaltic fluid pump to achieve a first predetermined amount of fluid in the first pressurized reservoir by pumping the fluid in a forward direction into the first pressurized reservoir and/or in a reverse direction out of the first pressurized reservoir,
c. the control signal generator configured to generate a second peristaltic pump control signal in response to the second fluid quantity signal, which second peristaltic pump signal is used to modulate operation of the second peristaltic fluid pump to achieve a second predetermined amount of fluid in the second pressurized reservoir by pumping the fluid in a forward direction into the second pressurized reservoir and/or in a reverse direction out of the second pressurized reservoir,
d. the control signal generator generating a peristaltic air pump control signal in response to a signal related to a pressure in at least one of the first pressurized reservoir and the second pressurized reservoir, which peristaltic air pump control signal is used to modulate operation of the peristaltic air pump to achieve a predetermined pressure in the second reservoir.

18. The system of claim 12, wherein the system is configured such that fluid entering the second peristaltic fluid pump defines a pressure $P_{entry}$, fluid exiting the second peristaltic pump defines a pressure $P_{exit}$, and $P_{exit}$ is within about 1% of of $P_{entry}$.

19. The system of claim 12, further comprising a flow cytometer, the flow cytometer being in fluid communication with the second pressurized reservoir.

* * * * *